Figure 1:
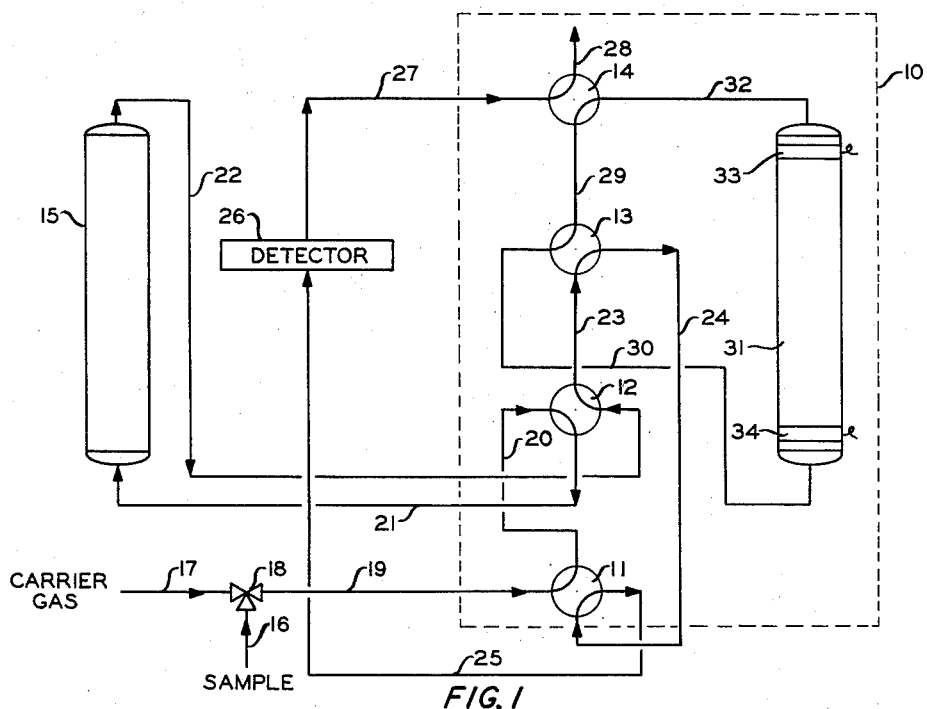

July 16, 1963  J. A. FAVRE  3,097,519
CHROMATOGRAPHIC ANALYZER

Filed July 13, 1960   3 Sheets-Sheet 1

INVENTOR.
J. A. FAVRE
BY Hudson & Young
ATTORNEYS

July 16, 1963 J. A. FAVRE 3,097,519
CHROMATOGRAPHIC ANALYZER
Filed July 13, 1960 3 Sheets-Sheet 3

INVENTOR.
J. A. FAVRE
BY Hudson & Young
ATTORNEYS

United States Patent Office 3,097,519
Patented July 16, 1963

3,097,519
CHROMATOGRAPHIC ANALYZER
John A. Favre, Bartlesville, Okla., assignor to Phillips Petroleum Company, a corporation of Delaware
Filed July 13, 1960, Ser. No. 42,705
2 Claims. (Cl. 73—23)

This invention relates to an improved chromatographic analyzer.

There is a need for analytical equipment capable of measuring the concentration of fluid stream constituents. One method of analyzing a fluid stream involves the use of a chromatographic analyzer. In chromatography, a sample of the material to be analyzed is introduced into a column containing the selective sorbent or partitioning material. A carrier gas is directed into the column so as to force the sample material therethrough. The selective sorbent, or partitioning material, attempts to hold the constituents of the mixture. This results in the several constituents of the fluid mixture flowing through the column at different rates of speed, depending upon their affinities for the packing material. The column effluent thus consists initially of the carrier gas alone, the individual constituents of the fluid mixture appearing later at spaced time intervals. A conventional method of detecting the presence and concentration of these constituents is to employ a thermal conductivity detector which compares the thermal conductivity of the effluent gas with the thermal conductivity of the carrier gas directed to the column.

Analyzing procedures utilizing a single chromatographic column are necessarily limited. Under specific operating conditions it becomes desirable to make complex analyses. For example, a single column chromatographic analyzer is incapable of analyzing for the total olefin concentration of a fluid stream without mathematically totaling the olefin peak chromatogram areas, representative of the olefin concentration. In a like manner, it becomes difficult by a single column chromatographic analyzer to determine the total exact concentration of the heavier components of a fluid stream. It is impossible with a single column to determine the exact concentration of a trace constituent of a fluid mixture when the fluid mixture contains a relatively high concentration of a close boiling constituent.

Accordingly, an object of this invention is to provide an improved chromatographic analyzer.

Another object of this invention is to provide an improved chromatographic constituent sorting unit to be attached to a conventional chromatographic analyzer.

Other objects, advantages, and features of my invention will be readily apparent to those skilled in the art from the following description and appended claims.

I have discovered a valve and column arrangement, hereinafter identified as a constituent sorting unit, for analyzing and storing specific peaks for further analysis, or by reversing the flow summing the stored peaks in a single reverse flow peak. The constituent (peak) sorting unit consists (in its simplest form) of four selector valves, one column, and the necessary tubing and fittings to attach to a conventional chromatographic analyzer.

FIGURES 1, 2, 3, 4 and 5 are schematic diagrams of specific embodiments of the inventive apparatus.

Referring to the drawings and to FIGURE 1 in particular, the inventive constituent sorting chromatographic unit 10 is illustrated in combination with a conventional chromatographic analyzer. Four-way selector valves 11, 12, 13 and 14 are positioned so as to provide for the conventional analysis of a fluid mixture on a single absorption, or partition, column 15. Column 15 is filled with a packing material which selectively retards the passage of the constituents of the fluid mixture to be analyzed. Valves 11, 12, 13 and 14 can be any type of four-way selector valve available on the market, such as the Republic four-way valve. A vaporous sample to be analyzed is introduced to column 15 by means of conduit 16, three-way valve 18, conduit 19, four-way valve 11, conduit 20, four-way valve 12, and conduit 21. Carrier gas is introduced to the column 15 in the same manner after entering three-way valve 18 by means of a conduit 17.

The effluent from column 15 is passed to detector 26 by means of a conduit 22, four-way valve 12, conduit 23, four-way valve 13, conduit 24, four-way valve 11, and conduit 25. The sample is vented from detector 26 by means of conduit 27, four-way valve 14 and conduit 28.

A detector 26 can be a thermal conductivity detector which includes a temperature sensitive resistant element placed in the path of fluid flow. A reference element, not shown, can be placed in the carrier gas flow. Such detector provides signals representative of the difference in thermal conductivity between the column effluent and the carrier gas. The temperature differences between the resistance element can be measured by electrical bridge circuits, such as a Wheatstone bridge, for example.

Control valves 11, 12, 13, 14 and 18 can be operated by a timer, not herein shown. This timer can be any type of apparatus known in the art for providing control signals in a desired sequence. A common type of timer utilizes a series of cam operated switches wherein the associated cams are rotated by a timing motor.

Figure 2:
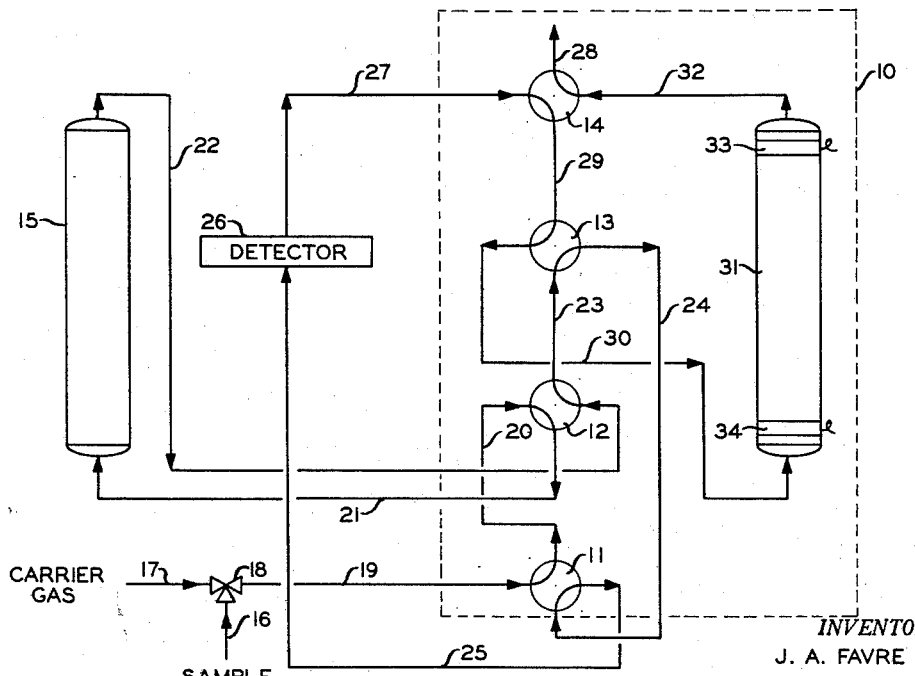

To determine, for example, the total olefin concentration of a complex fluid mixture, reference is made to FIGURE 2 illustrating an embodiment of the inventive apparatus positioned so as to store olefin peaks. A vaporous sample to be analyzed is introduced to column 15 by means of conduit 16, three-way valve 18, conduit 19, four-way valve 11, conduit 20, four-way valve 12 and conduit 21. Carrier gas is introduced to column 15 in the same manner after entering three-way valve 18 by means of conduit 17.

As in FIGURE 1, the effluent from column 15 is passed to detector 26 by means of conduit 22, four-way valve 12, conduit 23, four-way 13, conduit 24, four-way valve 11, and conduit 25. As each olefin constituent passes as effluent from detector 26 to four-way valve 14, four-way valve 14 is rotated so as to pass said olefin constituent to column 31 by means of conduit 29, four-way valve 13 and conduit 30. As other constituents of the sample fluid mixture are passed from detector 26, four-way valve 14 is positioned as in FIGURE 1 to thus vent the remaining sample constituents by means of conduit 28. The olefin peaks are now stored on column 31, said column 31 containing a packing material that selectively retards the passage of the constituents of a fluid mixture to be analyzed.

Figure 3:
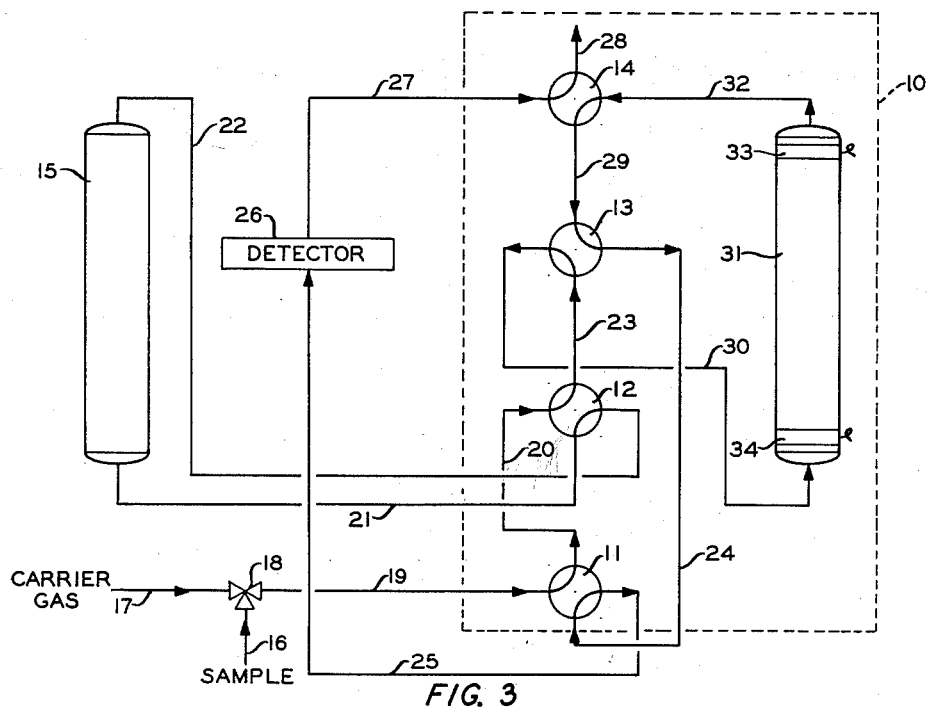

The olefin peaks stored on column 31 can then be separately analyzed or the total olefin concentration determined by positioning the four-way valves in the manner illustrated in FIGURE 3. The stored peaks can then be emitted from column 31 as a single peak by rapidly heating column 31. A suitable means of heating column 31 is to attach electrodes 33 and 34 to column 31 in the manner indicated and resistant heating said column 31 by passing an electrical current to said electrodes. The stored olefins in a concentrated form are passed by means of conduit 32, four-way valve 14, conduit 29, four-way valve 13, conduit 24, four-way valve 11 and conduit 25 to detector 26 where the total olefin concentration is determined.

The olefins stored on column 31 may be separately analyzed by introducing a carrier gas to column 31 by means of conduit 17, three-way valve 18, conduit 19, four-way 11, conduit 30, four-way valve 12, conduit 23, four-way valve 13 and conduit 30. The separated stored olefin peaks are passed as effluent from column 31 to be analyzed by detector 26 in the manner previously described.

When it becomes desirable to determine the total concentration of the heavier constituents of a fluid mixture, the valve position of FIGURE 1 is maintained until the light constituents have passed as effluent from column 15. At this time, four-way valve 11 is rotated, placing the chromatographic analyzer in the operating position illustrated by FIGURE 4. Carrier gas is passed to the top of column 15 by means of conduit 17, three-way valve 18, conduit 19, four-way valve 11, conduit 24, four-way valve 13, conduit 23, four-way valve 12, and conduit 22. The carrier gas passes through column 15 back flushing said column 15. The effluent containing the heavier constituents passes from column 15 to detector 26 by means of a conduit 21, four-way valve 12, conduit 20, four-way valve 11, and conduit 25 where a property of the effluent representing the concentration of said heavier constituents is measured. The effluent is emitted from detector 26 by means of a conduit 27, four-way valve 14 and vent conduit 28.

Figure 4:
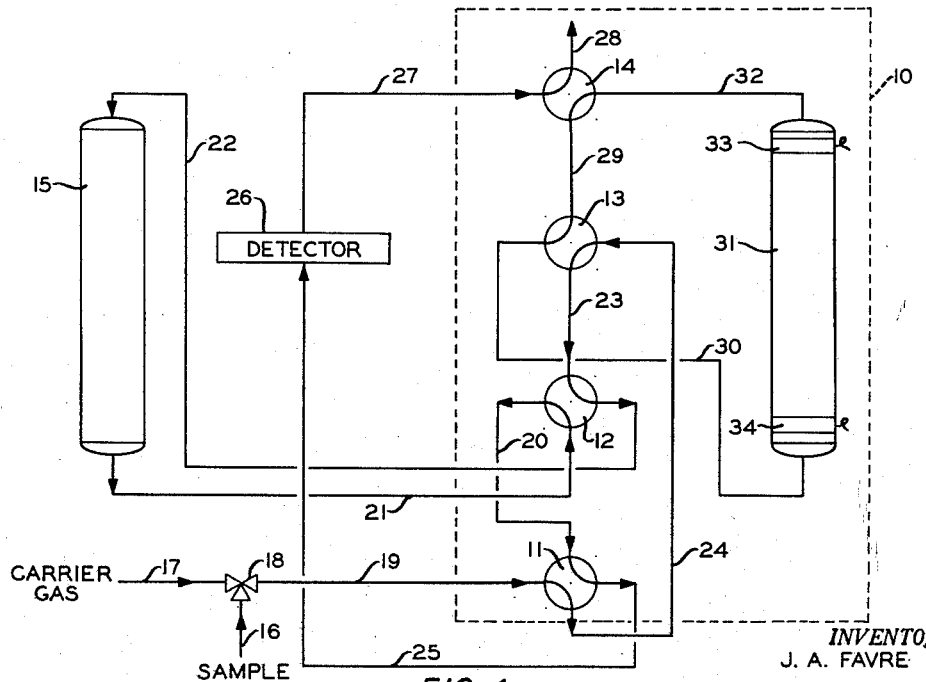
Figure 5:
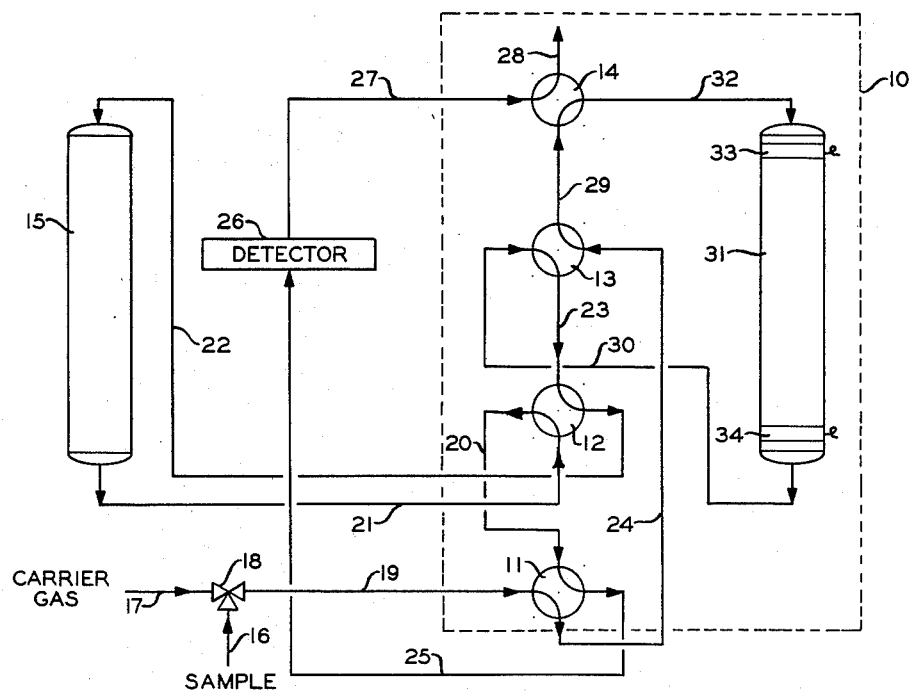

FIGURE 5 illustrates a method whereby the olefins stored on column 31 by the method of FIGURE 2 may be back flushed as a single peak. Carrier gas is introduced to the top of column 31 by means of a conduit 17, three-way valve 18, conduit 19, four-way valve 11, conduit 24, four-way valve 13, conduit 29, four-way valve 14, and conduit 32. The back flushed effluent is removed from column 31 by means of a conduit 30, four-way valve 13, conduit 23, four-way valve 12, conduit 22, column 15, conduit 21, four-way valve 12, conduit 20, four-way valve 11, and conduit 25, and passed to detector 26 wherein the single olefin peak is recorded. Obviously, FIGURES 4 and 5 illustrate a method of back flushing columns 15 and 31 in preparation for future sample analyses. Additional columns for initial separation can be utilized by adding another selector valve. An adidtional storage column can be utilized with the addition of two selector valves.

As will be evident to those skilled in the art, various modifications of this invention can be made, or followed, in the light of the foregoing disclosure and discussion, without departing from the spirit or scope thereof.

I claim:

1. Apparatus comprising, in combination, first and second columns each of which contain a material that selectively retards the passage therethrough of the constituents of a fluid mixture to be analyzed; first, second, third and fourth four-way selector valves; first conduit means communicating with the sample inlet of said first selector valve for the introduction of a carrier gas; second conduit means communicating with said sample inlet of said first selector valve for the introduction of the fluid mixture to be analyzed; third conduit means communicating between said first selector valve and said second selector valve; fourth conduit means communicating between said first selector valve and a means of measuring a property of a fluid mixture which is representative of the composition thereof; fifth conduit means communicating between said first selector valve and said third selector valve, said first selector valve effecting communication between said sample inlet and said third conduit means and between said fourth and fifth conduit means in a first position, and between said sample inlet and said fifth conduit means and between said third and fourth conduit means in a second position; sixth conduit means communicating between said second selector valve and said third selector valve; seventh conduit means communicating between said second selector valve and the outlet of said first column; eighth conduit means communicating between said second selector valve and the inlet of said first column, said second selector valve effecting communication between said third and eighth conduit means and between said sixth and seventh conduit means in a first position, and between said third and sixth conduit means and between said seventh and eighth conduit means in a second position; ninth conduit means communicating between said third selector valve and the inlet of said second column; tenth conduit means communicating between said third selector valve and said fourth selector valve, said third selector valve effecting communication between said sixth and fifth conduit means and between said ninth and tenth conduit means in a first position, and between said sixth and ninth conduit means and between said fifth and tenth conduit means in a second position; eleventh conduit means communicating between said fourth selector valve and a means of measuring a property of the fluid mixture which is representative of the composition thereof; twelfth conduit means communicating with said fourth selector valve; thirteeenth conduit means communicating between said fourth selector valve and the outlet of said second column, said fourth selector valve effecting communication between said eleventh and twelfth conduit means and between said tenth and thirteenth conduit means in a first position, and between said tenth and eleventh conduit means and between said twelfth and thirteenth conduit means in a second position.

2. The apparatus of claim 1 wherein a heater is in thermal contact with said second column.

References Cited in the file of this patent

Article: Two Stage G.L.C. by M. Simmons and L. R. Snyder, published in Analytical Chemistry, vol. 30, No. 1, January 1958, pages 32–35. (Copy in 73–23C.)